Patented Nov. 27, 1973

3,775,363
OXYMETHYLENE POLYMER COMPOSITIONS CONTAINING ACICULAR CALCIUM METASILICATE
David M. Braunstein, Fanwood, N.J., assignor to Celanese Corporation, New York, N.Y.
No Drawing. Filed Apr. 21, 1972, Ser. No. 246,444
Int. Cl. C08g *51/10, 51/04*
U.S. Cl. 260—37 AL                                    8 Claims

ABSTRACT OF THE DISCLOSURE

An oxymethylene polymer composition is disclosed and claimed which comprises an oxymethylene polymer and acicular calcium metasilicate. The claimed composition has improved processability, dimensional stability strength values.

BACKGROUND OF THE INVENTION

Field of the invention

This invention relates broadly to oxyalkylene polymers and, more particularly, to filled oxymethylene polymer compositions (both homopolymers and copolymers) having improved processability, dimensional stability and aging characteristics while retaining high tensile strength values.

Descripton of the prior art

Oxyalkylene polymers, specifically oxymethylene polymers having recurring —$CH_2O$— units, have been known for many years. They may be prepared by the polymerization of anhydrous formaldehyde or by the polymerization of trioxane, which is a cyclic trimer of formaldehyde.

High-molecular-weight oxymethylene polymers have been prepared by polymerizing trioxane in the presence of certain fluoride catalysts. They may also be prepared in high yields and at rapid reaction rates by the use of catalysts, comprising boron fluoride coordination complexes with organic compounds, as described in U.S. Pat. No. 2,989,506 of Donald E. Hudgin and Frank M. Beradinelli.

Other methods of preparing oxymethylene polymers are disclosed by Kern et al. in Angewandte Chemie, 73 (6), 177–186 (Mar. 21, 1961), and in Sittig, "Polyacetals: What You Should Know," Petroleum Refiner, 41, 11, 131–170 (November 1962), including polymers containing repeating carbon-to-carbon single bonds in the polymer chain and which are made by copolymerizing trioxane with cyclic ethers, e.g., dioxane, lactones, e.g., beta-propiolactone, anhydrides, e.g., cyclic adipic anhydride, and ethylenically unsaturated compounds, e.g., styrene, vinyl acetate, vinyl methyl ketone, acrolein, etc.

Also contemplated in the production of modified oxyalkylene, specifically oxymethylene, polymeric compositions of the instant invention are oxymethylene polymers the end groups of which are reacted or "capped" with, for example, a carboxylic acid or a monomeric ether. Typical capping agents are alkanoic acids (e.g., acetic cid), which form ester end groups, and dialkyl ethers (e.g., dimethyl ether), which form ether end groups.

Still other oxymethylene polymers, more particularly copolymers, which are adapted for use in producing the modified oxymethylene polymers of this invention are those which are prepared as described in U.S. Pat. No. 3,027,352 of Walling et al. by copolymerizing, for example, trioxane with any of various cyclic ethers having at least two adjacent carbon atoms, e.g., ethylene oxide, dioxolane, and the like.

Oxymethylene polymers are distinguished by a number of excellent properties so that they are suitable for a variety of industrial applications. Many of these desirable properties result from the fact that these oxymethylene polymers are crystalline.

However, microscopic examination of thin sections of such polymers also shows that there is a non-homogeneous coarse spherulitic structure which when forming during solidification of a melt, produces different shrinkage values, distortions, and internal stresses, which lead to variations in the dimensions of molded units manufactured therefrom.

During injection molding operations, this inhomogenity, in combination with the low flowability and lengthy "set-up" times of the natural unfilled resin in molds, have limited the commercial applicability of this synthetic plastic considerably.

It would be extremely desirable to find a means to improve the processability, i.e., the flowability, set-up times, etc., and/or improve the dimensional stability of the molded resin product without sacrificing inherent properties of the natural resin, such as its high tensile strength, which qualify it as an engineering plastic.

British Pat. 1,133,490 issued on Nov. 13, 1968 discloses an oxymethylene polymer composition containing a silicate, preferably powdered talc at from 0.0001 percent to 0.5 weight percent based on the weight of the oxymethylene polymer, said oxymethylene polymer having finely crystalline, homogeneous structure with average crystalline diameters of from about 4 to 8 microns. Although this controlled spherulite size modified oxymethylene polymer shows increased dimensional stability, this is accompanied by a decrease in impact strengths and no noticeable change in processability.

SUMMARY OF THE INVENTION

It is an object of the present invention to provide an oxymethylene polymer composition with improved processability and dimensional stability.

It is also an object of this invention to provide an oxymethylene polymer molding mixture which realizes improved thermal aging characteristics.

These and other objects are obtained by incorporating into unreinforced or reinforced oxymethylene molding resin, acicular calcium metasilicate.

DETAILED DESCRIPTION OF THE INVENTION

The oxymethylene polymer of this invention may be, as previously has been indicated, homopolymeric oxymethylene or an oxymethylene copolymer. The two are not the full equivalent of each other as the main or primary component in the modified polymeric compositions of this invention. The preferred primary component is a copolymer of oxymethylene.

The oxymethylene polymers useful in this invention may be prepared as broadly and more specifically described in the second through the sixth paragraphs of this specification and in the citations therein given. An oxymethylene copolymer of the kind disclosed and claimed in the aforementioned Walling et al. patent is especially suitable for use as the copolymer that is modified in producing the polymeric compositions with which this invention is concerned.

Thus, the oxymethylene copolymer used in carrying this invention into effect may be a polymer having a structure comprising recurring units represented by the general formula (I) 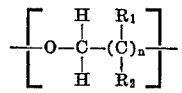

wherein each $R_1$ and $R_2$ is selected from the group consisting of hydrogen, lower alkyl and halogen-substituted lower alkyl radicals, and wherein $n$ is an integer from zero to three, inclusive, and $n$ being zero in from 85% to 99.9% of the recurring units. Each lower alkyl radical preferably has from one to two carbon atoms, inclusive. The oxymethylene copolymer may be defined more specifically as a normally solid, substantially water-insoluble copolymers, the repeating units of which consist essentially of (A) —OCH$_2$— groups interspersed with (B) groups represented by the general formula (II) 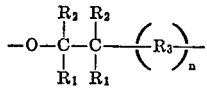

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals and $n$ is an integer from zero to three inclusive.

Each lower alkyl radical preferably has from one to two carbon atoms, incusive. The —OCH$_2$— units of (A) constitute from 85% to 99.9% of the recurring units. The units of (B) are incorporated into the copolymer during the step of copolymerization to produce the copolymer by the opening of the ring of a cyclic ether having adjacent carbon atoms by the breaking of an oxygen-to-carbon linkage.

Polymers of the desired structure may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general, the cyclic ethers employed in making the oxymethylene copolymer are those represented by the general formula (III) 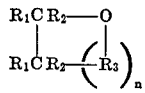

wherein each R$_1$ and R$_2$ is selected from the group consisting of hydrogen, lower alkyl and halogen-substituted lower alkyl radicals, and each R$_3$ is selected from the group consisting of methylene, oxymethylene, lower alkyl and haloalkyl-substituted methylene and lower alkyl and haloalkyl-substituted oxymethylene radicals, and $n$ is an integer from zero to three inclusive. Each lower alkyl radical preferably has from one to two carbon atoms inclusive.

The preferred cyclic ethers used in the preparation of the oxymethylene copolymers are ethylene oxide and 1,3-dioxolane, which may be represented by the formula (IV) 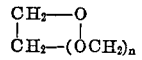

wherein $n$ represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalysts used in preparing the oxymethylene copolymers are the aforementioned boron fluoride coordinate complexes, numerous examples of which are given in the previously identified Walling et al. patent. Reference is made to this patent for further information concerning the polymerization conditions, amount of catalyst employed, etc.

The oxymethylene copolymers produced from the preferred cyclic ethers have a structure composed substantially of oxymethylene and oxyethylene groups in a ratio of from about 6 to 1 to about 1000 to 1.

The oxymethylene copolymers described briefly above are members of the broader group of such copolymers that are useful in practicing the present invention and which have at least one chain containing recurring oxymethylene units interspersed with —OR— groups in the main polymer chain. In such —OR— groups, R represents a divalent radical containing at least two carbon atoms linked directly to each other and positioned in the polymer chain between the two valences with any substituents on said radical being inert, that is, substituents that are free from interfering functional groups and do not induce undesirable reactions under the conditions involved. Among such copolymers that advantageously may be employed in practicing this invention are oxymethylene copolymers containing from about 60 mole percent to 99.9 mole percent of recurring oxymethylene groups to from 0.1 mole percent to about 40 mole percent of —OR— groups, and more particularly from 60:99.6 mole percent of the former to 0.4:40 mole percent of the latter. As indicated hereinbefore, the most preferred copolymers are those having from about 85 mole percent to 99.9 mole percent of recurring oxymethylene groups and from 0.1 to 15 mole percent of —OR— groups. In a preferred embodiment R may be, for example, an alkylene or substituted alkylene group containing at least two carbon atoms.

Also useful in carrying the instant invention into effect are oxymethylene copolymers having a structure comprising recurring units consisting essentially of those represented by the general formula V) 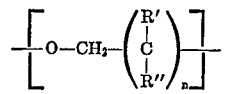

wherein $n$ represents an integer from 0 to 5 inclusive, and representing 0 (zero) in from 60 to 99.6 mole percent of the recurring units; and R' and R" represent inert substituents, that is, substituents which are free from interfering functional groups and will not induce undesirable reactions. Thus, one advantageously may utilize oxymethylene copolymers having a structure comprising oxymethylene and oxyethylene recurring units wherein from 60 to 99.9 e.g., from 60 or 70 to 99.6 mole percent of the recurring units are oxymethylene units.

It has previously been indicated that especially preferred copolymers employed in practicing the present invention are those containing in their molecular structure oxyalkylene units having adjacent carbon atoms which are derived from cyclic ethers having adjacent carbon atoms. Such copolymers may be prepared by copolymerizing trioxane or formaldehyde with a cyclic ether represented by the general formula (VI) 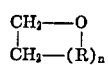

wherein $n$ represents an integer from zero to 4, inclusive, and R represents a divalent radical selected from the group consisting of (a) CH$_2$, (b) CH$_2$O, and (c) any combination of CH$_2$ and CH$_2$O.

Examples of specific cyclic ethers that may be used in preparing copolymers of the kind embraced by Formula VI, in addition to the cyclic ethers previously mentioned with reference to the copolymers embraced by Formula IV, and of acetals and cyclic esters that may be employed instead of cyclic ethers, are 1,3,5-trioxepane, 1,3-dioxepane betapropiolactone, gammabutyrolactone, neopentyl formal, pentaerythritol diformal, paraldehyde, and butadiene monoxide. In addition, glycols including for example, ethylene glycol, diethylene glycol, 1,3-butylene glycol, propylene glycol and the like may be employed instead of the cyclic ethers, acetals and esters just mentioned.

Although formaldehyde is a desirable source of the oxymethylene moiety (i.e., R$_2$O wherein R$_2$ represents methylene or substituted methylene), it will be understood, of course, by those skilled in the art that instead of formaldehyde, other sources of the oxymethylene moiety may be used; e.g., paraformaldehyde, trioxane, acetaldehyde, propionaldehyde, and the like. One may also employ cyclic acetals, e.g., 1,3,5-trioxepane, in lieu of both the cyclic ether and formaldehyde.

The term "oxymethylene" as used in the specification and claims of this application, unless it is clear from the context that a more specific meaning is intended, includes substituted oxymethylene, wherein the substituents are inert with respect to the reactions in question; that is, the substituents are free from any interfering functional group or groups that would cause or result in the occurrence of undesirable reactions.

Also, as used in the specification and claims of this application, the term "copolymer" means polymers obtained by copolymerization of two or more different monomers (i.e., polymers containing in their molecular structure two or more different monomer units), and includes terpolymers, tetrapolymers and higher multicomponent polymers. The term "polymer" (unless it is clear from the context that the homopolymer or a copolymer is intended) includes within its meaning both homopolymers and copolymers.

In some cases it is especially desirable to use oxymethylene terpolymers as the oxymethylene polymer component of the compositions of this invention, e.g., in making molding compositions especially adapted for use in making blow-molded or otherwise shaped articles e.g., bottles or other types of containers. Oxymethylene terpolymers that are particularly useful in such applications, as well as for other purposes, include those disclosed in copending U.S. application Ser. No. 444,787, filed Apr. 1, 1965 (now abandoned), by W. E. Heinz and F. B. Mc-Andrew, assigned to the same assignee as the instant invention, and which by this cross-reference is made a part of the disclosure of the present application. The aforesaid copending application Ser. No. 444,787 is a continuation-in-part of application Ser. No. 229,715, filed Oct. 10, 1962 (now abandoned), which in turn is a continuation-in-part of application Ser. No. 153,720, filed Nov. 20, 1961 (also now abandoned).

The oxymethylene polymers that are modified to produce the compositions of this invention are thermoplastic materials having a melting point of at least 150° C., and normally are millable or processable at a temperature of about 200° C. They have a number average molecular weight of at least 10,000. The preferred oxymethylene polymers have an inherent viscosity of at least 1.0 (measured at 60° C. in a 0.1 weight percent solution in p-chlorophenol containing 2 weight percent of alpha-pinene).

The oxymethylene polymer component of the compositions of this invention may be, if desired, oxymethylene polymers that have been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in the U.S. patent of Frank M. Berardinelli, U.S. Pat. No. 3,219,623, filed June 3, 1964, as a continuation-in-part of application Ser. No. 102,097, filed Apr. 11, 1961, now abandoned. Pat. No. 3,219,623 is assigned to the same assignee as the present invention, and by this cross-reference is made a part of the disclosure of the instant application.

Catalysts suitable for use in polymerizing trioxane or formaldehyde alone or with other copolymerizable components in producing the oxymethylene polymers that are modified to produce the compositions of this invention may be widely varied. Preferred catalysts are cationic catalysts, including such inorganic fluorine-containing catalysts as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorous pentafluoride, hydrogen fluoride, and compounds containing these materials, such as boron fluoride coordinate complexes with organic compounds, particularly those in which oxygen or sulfur is a donar atom.

Other suitable catalysts include thionyl chloride, fluorosulfonic acid, methanesulfonic acid, phosphorous trichloride, titanium tetrachloride, ferric chloride, zirconium tetrachloride, aluminum trichloride, stannic chloride and stannous chloride.

The particularly preferred catalysts are boron fluoride and boron fluoride-containing materials, such as boron fluoride monohydrate, boron fluoride dihydrate and boron fluoride trihydrate as well as boron fluoride coordinate complexes with organic compounds as mentioned previously.

As indicated earlier in this specification, it is also within the purview of this invention to utilize oxymethylene polymers, including homopolymers of trioxane or of formaldehyde, the molecules of which have been "end-capped" by known methods of etherification or of esterification.

The oxymethylene polymer compositions of the present invention can be produced by preparing a substantially homogeneous admixture including (A) a normally solid, oxymethylene polymer, and (B) acicular calcium metasilicate. The calcium metasilicate, which has a regularly uniform, needle-like structure should be present in said admixture at from about 2 to about 75 weight percent and preferably from about 10 to about 65 weight percent based upon the weight of said oxymethylene polymer.

The admixture may be prepared by any means known to those skilled in the art whereby a substantially homogeneous composition is obtained. For example, the acicular calcium metasilicate may be incorporated into the plastic polymer while the latter is being kneaded, e.g., on heated rolls or during passage through screw-type or other type of mixer-extruder apparatus. Or the metasilicate may be blended with finely divided polymer in any suitable blending apparatus and the blend then extruded to form a substantially homogeneous composition.

The oxymethylene polymer compositions of the present invention may also include, if desired, plasticizers, fillers, pigments, thermal stabilizers, antioxidants, or other stabilizers such as those which are stabilizers against degradation by ultra-violet light.

In order that those skilled in the art may better understand how the present invention can be carried into effect, the following examples are given by way of illustration and not by way of limitation. All parts and percentages are by weight unless otherwise stated.

EXAMPLE I

The oxymethylene polymer (acetal polymer) used in this example is a trioxane-ethylene oxide copolymer containing about 2 weight percent of comonomer units derived from ethylene oxide (POM). It is prepared as previously has been broadly described herein and more specifically in the cited art, e.g., the aforementioned Walling et al. Pat. No. 3,027,352. It is in flake form or pellets and about 70% of the copolymer passes through a 40-mesh screen. It has an inherent viscosity (I.V.) of about 1.2 (measured at 60° C. in 0.1 weight percent solution in p-chlorophenol containing 2 weight percent of alpha-pinene).

EXAMPLES II–VI

The oxymethylene polymer of Example I is admixed with acicular calcium metasilicate at 5; 10; 20 and 30 weight percent loadings based on the total weight of the composition and the 1× melt indices and 10× melt index ratios i.e. low shear and high shear ratio data, are as follows in Table I. (The apparatus used and method of determining melt indices are described in ASTM D–1238–57T.)

TABLE I

| Acicular CaSiO₃ (wt. percent) | 1X | 10X/1X |
|---|---|---|
| 0 (control) | 9.1 | 17.0 |
| 5 | 8.0 | 17.2 |
| 10 | 7.3 | 16.8 |
| 20 | 6.4 | 16.2 |
| 30 | 5.3 | 15 |

As can be seen by the above examples, the addition of acicular calcium metasilicate to an unfilled POM resin will increase the viscosity of the composition about 40% at a 30 weight percent loading over the viscosity of the control, however, and of major significance reuse of said compositions in processing extruders, the shear sensitivities stay at about the same level.

EXAMPLES VII–IX

The POM flake of Example I is processed through a 2½ inch Prodex Extruder with barrel and die temperatures of about 420° F. With the screw speed held constant at 95 r.p.m., the throughput rate of the extruder is approximately 1.8 pounds per minute.

When 10 weight percent based on the weight of the total composition of acicular calcium metasilicate is admixed with the POM flake of Example I and processed as described above in the Prodex Extruder a throughput rate of 2.8 pounds per minute is achieved.

EXAMPLES X–XI

The oxymethylene polymer used in these examples is a trioxane-ethylene oxide copolymer containing about 2 weight percent of comonomer units derived from ethylene oxide (POM). It is prepared as previously has been broadly described herein and more specifically in the cited art, e.g., the aforementioned Walling et al. Pat. No. 3,027,352. It is in flake form and about 70% of the copolymer poises through a 40-mesh screen. It has a melt index of about 27.

This polyoxymethylene copolymer and compositions composed of this copolymer and 10 weight percent based on the total weight of the composition are sequentially processed in an 8 ounce Stokes Reciprocal Screw Injection Molding Machine to fill an 8 cavity 3⅝" platform/disc mold. The operating temperatures and pressures which are essentially identical for both runs are as follows:

Zone: Temp. (° F.)
Nozzle _____ 440
Front _____ 420
Center _____ 410
Rear _____ 400
Melt _____ 415
Mold _____ 80–85

Pressure, (p.s.i.g.)
Injection _____ 1050
Hold _____ 900
Back _____ 0

However, the total cycle time, i.e. the injection and cool times are substantially different and are as follows.

| Zone | 10% CaSiO₃ | 0% CaSiO₃ (control) |
|---|---|---|
| Injection, seconds | 3.5 | 4.0 |
| Cool, seconds | 7.5 | 8.0 |
| R.p.m. | Max. | Max. |
| Injection speed | Max. | Max. |

Thus, whereas the copolymer control of the example requires a total cycle time of about 12 seconds, the same copolymer with 10 weight percent acicular calcium metasilicate admixed has a cycle time of less than 11 seconds. The statement "less than eleven seconds" is believed correct for 11 seconds is the absolute minimum cycle time realizable with the Stokes molding machine of the example.

In comparison, when tests are conducted utilizing 10 and 20 weight percent (based on the total weight of the composition) loadings of talc in lieu of the calcium metasilicate of the instant invention, there occurs no decrease in total cycle times.

EXAMPLES XII–IXX

As described in Examples X and XI, the 8 cavity mold produces 3⅝" platform discs. The discs produced by the polyoxymethylene copolymer alone are compared with those prepared by a 10 weight percent acicular calcium metasilicate composition and the "total variation" or "out of roundness" data is as follows:

| | Total variation (mils) | |
|---|---|---|
| | 0% CaSiO₃ (control) | 10% CaSiO₃ |
| Disc number: | | |
| 1 | 17 | 8 |
| 2 | 23 | 11 |
| 3 | 26 | 9 |
| 4 | 20 | 11 |
| 5 | 9 | 9 |
| 6 | 24 | 12 |
| 7 | 11 | 10 |
| 8 | 24 | 14 |

Thus, concurrent with cycle reduction as shown in Examples X and XI, the addition of acicular calcium metasilicate improves dimensional stability.

EXAMPLES XX–XXVI

The copolymer of Example I is admixed with a variety of inorganic fillers and molded into 8¼" long tensile bars in order to examine the degree of warpage associated with such fillers in the copolymers of the instant invention. The results are as follows.

| Weight percent | | | | |
|---|---|---|---|---|
| Glass | Acicular CaSiO₃ | Talc | Fybex [1] | Warpage |
| 20 | | | | Severe. |
| 20 | | 10 | | Do. |
| 20 | | | 10 | Do. |
| 0 | | | 25 | Medium. |
| 25 | | | | Severe. |
| 25 | 10 | | | Low. |
| 0 | 40 | | | Low. |

[1] Trademark of DuPont; crystals of potassium titanate.

As can be seen by the above examples, the addition of talc or Fybex to a glass filled polyoxymethylene copolymer does little to reduce the severe warpage problems associated with such resin/glass mixtures. In fact, Fybex which is a fibrous material, introduces warpage when it is used alone with the POM resins.

Surprisingly however, acicular calcium metasilicate which has an inherent needle-like structure, not only does not induce warpage when admixed with POM resins alone even at extremely high filler loadings but actually drastically reduces and in some cases totally eliminates warpage in glass filled POM resin compositions.

EXAMPLES XXVII–XXXIII

In the following examples, physical property data is presented for tensile bars prepared from (1) a polyoxymethylene copolymer prepared by the method of Example I and having a melt index of 9.0; compositions composed of said copolymer and various acicular calcium metasilicate loadings; a polyoxymethylene ester endcapped homopolymer with a melt index of about 10 (Delrin 500—NC10; a resin trademark of DuPont); and a composition composed of said homopolymer and 10 weight percent acicular calcium metasilicate.

| Acicular CaSiO₃ (wt. percent) | Tensile strength (p.s.i.) | Elongation break (percent) | Flexural modulus | Notched Izod |
|---|---|---|---|---|
| Copolymer (control) | 8,200 | 56 | 3.35×10⁵ | 1.1 |
| 5 | 8,100 | 18 | | 0.8 |
| 10 | 8,100 | 11 | 4.25×10⁵ | 0.8 |
| 10 (gamma amino propyl triethoxy silane ¹) | 8,100 | 11 | 4.55×10⁵ | 0.8 |
| 20 | 8,200 | 7 | | 0.6 |
| 30 | 7,800 | 4 | | 0.6 |
| Homopolymer (control) | 9,730 | 17 | 4.23×10⁵ | 1.1 |
| 10 | 8,800 | 10 | 5.09×10⁵ | 0.6 |

¹ An amino silane sizing agent.

As the above examples illustrate tensile strengths remain essentially constant as the polyoxymethylene copolymers of the instant invention are filled with acicular calcium metasilicate, even at very high loadings. There does occur a slight decrease in said tensile properties when the homopolymer resin is used however. It is also observed, that when a silane sizing agent is used with the acicular CaSiO₃ an increase in stiffness can be realized.

EXAMPLES XXXIV–XXXVIII

Percent polymer weight loss per minute as determined by heating copolymer of Examples XXVIII–XXXIII which have been stabilized with an antioxidant and a formaldehyde scavenger in an open vessel in a circulating air oven at a temperature of 230° C., i.e. $K_{d230°C.}$ are determined and the results are as follows:

Acicular
CaSiO₃ (wt. percent)                     $K_{d230°C.}$
  Copolymer (control) _____ 0.015
  10 _____ 0.011
  30 _____ 0.011
  Homopolymer (control) _____ 0.022
  10 _____ 0.32

Thus, the above examples demonstrate the improved processability, dimensional stability and thermal aging characteristics realizable when reinforced or unreinforced polyoxymethylene polymer is admixed with acicular calcium metasilicate. These improvements can be summarized as follows:

(1) Even though initial viscosity of the admixture is increased the high shear sensitivity is sustained and actual increases exceeding 50% in extruder through-put rates can be achieved;

(2) Concurrent with a reduction in molding cycle times, the CaSiO₃ addition significantly improves dimensional stability;

(3) Acicular calcium metasilicate, even though it possesses an inherent needle-like structure, not only does not induce warpage when admixed with polyoxymethylene resins alone even at extremely high loadings, but actually drastically reduces and in some cases totally eliminates warpage in glass-filled polyoxymethylene compositions;

(4) Tensile strengths are retained at high loadings of acicular calcium metasilicate and when an amino silane sizing agent is used with the acicular material, an increase in physical properties, specifically stiffness occurs; and (5) Finally, in contrast to homopolymer admixtures, the thermal aging characteristics ($K_{d230°C.}$) of polyoxymethylene polymer is significantly improved by acicular calcium metasilicate addition.

It will be understood, of course, by those skilled in the art that the present invention is not limited to the specific oxymethylene polymers or to the procedures and percentages in formulating the compositions and in forming molded articles therefrom that have been given in the foregoing examples for purpose of illustration. For instance, instead of a copolymer of trioxane with from about 0.1 to about 15 mole percent of ethylene oxide, specifically 2 mole percent, there may be employed binary polymers wherein a corresponding molar percentage of dioxolane is substituted for ethylene oxide in making the copolymer.

Also, various other oxymethylene binary and ternary polymers may be used instead of the particular binary and ternary polymers employed in the various examples, and which are disclosed both broadly and specifically in the aforementioned Heinz et al. application Ser. No. 444,787.

The oxymethylene terpolymers used in the compositions of this invention may be defined as being normally solid, substantially water-insoluble terpolymer of (1) from 75 to 99.9 weight percent of a source of a chain of recurring oxymethylene units, e.g., trioxane; (2) from 0.1 to about 18 weight percent of a bi- or higher multifunctional compound such as a cyclic ether having a single cyclic ether ring having adjacent carbon atoms therein, and having from two to ten carbon atoms in said ring, e.g., ethylene oxide; and (3) from 0.01 to about 7 weight percent of a chain-branching agent having at least two functional oxygen groups and being selected from the group consisting of compounds having at least two cyclic ether rings having from two to ten carbon atoms in each ring, and dialdehydes and diketones having from two to twenty carbon atoms. An example of a chain-branching agent of (3) is a poly (1,2-epoxide), specifically vinyl cyclohexane dioxide, a sub-group of such terpolymers consists of those having by weight, from about 96.1 to 97.9 percent oxymethylene units, about 2.0 to 2.9 percent of oxymethylene units, and less than about 1%, preferably between about 0.05 and 0.80 percent, of units from the chain-branching agent.

The bi- or higher multi-functional (i.e., at least bi-functional) compounds are compounds having at least two reactive centers such that the compound is capable of reacting in an at least bi-functional manner with the source of oxymethylene units and the chain-branching agent to form a normally solid, thermoplastic, moldable terpolymer. The bi- or higher multi-functional compounds used in making the terpolymers provide —O—R— units interspersed among the oxymethylene groups; R in the grouping —O—R— represents a divalent radical containing at least two carbon atoms directly linked to each other and positioned in the chain between the two valences. Such substituents advantageously are, for instance, hydrocarbon, halo-hydrocarbon or other groupings that are inert with respect to formaldehyde under the polymerization conditions.

Preferred compounds that are at least bi-functional employed in making terpolymers include (1) those having at least two functional groups, (2) those having at least one unsaturated bond, (3) those having at least one openable ring structure and (4) combinations of two or more of (1), (2) and (3). Specific examples of compounds that are at least bi-functional and are preferably cyclic ethers having adjacent carbon atoms, include ethylene oxide, 1,3-dioxolane, and others mentioned hereinbefore, in Walling et al. U.S. Pat. No. 3,027,352, the previously cited Kern et al. article, and the aforementioned Heinz et al. application.

The particular chain-branching agents employed may be varied considerably, the chosen agent depending upon such influencing factors, as, for example, the particular relationship and conditions under which it is used, its cost, etc. Among suitable chain-branching agents may be mentioned those having at least two functional oxygen groups including (1) cyclic ethers having at least two cyclic ether rins, e.g., 2,2-(trimethylene)bis-1,3-dioxolane, and particularly those compounds having (a) at least two epoxy rings, such as polyepoxides, including diepoxides, triepoxides, etc., (b) at least two formal rings, e.g., pentaerythritol diformal, and (c) at least one epoxy ring and at least one formal ring, e.g., mono-crotylidene trimethylolethane monoepoxide; and (2) compounds having at least two oxo groups such as dialdehydes and diketones, e.g., glutaraldehyde terephthalide and acrolein dimer.

Suitable polyepoxides include those that may be prepared by the epoxidation of compounds having two or more olefinic linkages. Diepoxides of diolefins are usually employed, and the epoxidized olefinic bonds may be of aliphatic or cycloaliphatic structures. More specific examples of diepoxides that may be used include butadiene dioxide, vinylcyclohexane dioxide (1-epoxyethyl-3,4-epoxycyclohexane), linonene dioxide, resorcinol, diglycidyl ether, bis-epoxydicyclopentyl ether of ethylene glycol, dicyclopentadiene dioxide and dicrotylidene pentaerythritol diepoxide. Suitable higher polyepoxides include the various triepoxides, e.g., triglycidyl trimethylol propane.

The preferred terpolymers used in practicing the present invention contain (1) oxymethylene groups interspersed with (2) oxyalkylene groups with adjacent carbon atoms derived from the bi- or higher multi-functional compound employed (preferably a cyclic ether having adjacent carbon atoms) and (3) oxyalkylene groups having carbon atoms linked to other chains, the last-named groups being derived from the chain-branching agent. Still more preferred terpolymers are those wherein the oxyalkylene groups of (2) supra, are oxyethylene groups derived by opening the ring structure of a cyclic ether containing oxyethylene groups, e.g., ethylene oxide, 1,3-dioxolane, and the like.

Specific terpolymers that are useful in practicing the present invention include those obtained by copolymerization of the following components in the stated approximate parts by weight:

100 parts by weight trioxane, 2 parts by weight ethylene oxide and 0.1 part by weight vinylcyclohexene oxide;

100 parts by weight trioxane, 2 parts by weight ethylene oxide and 0.5 part by weight diacetal of malonaldehyde and ethylene glycol;

100 parts by weight trioxane, 2 parts by weight ethylene oxide and 2 parts by weight sorbitol triformal;

100 parts by weight trioxane, 2 parts by weight ethylene oxide and 0.5 part by weight vinylcyclohexene oxide;

100 parts by weight trioxane, 2 parts by weight ethylene oxide and 0.5 part by weight butadiene dioxide;

100 parts by weight trioxane, 2 parts by weight ethylene oxide and 0.3 part by weight triepoxide of the triallyl ether of trimethylolpropane;

100 parts by weight trioxane, 12.6 parts by weight 1,3-dioxolane and 0.5 part by weight vinylcyclohexene dioxide;

100 parts by weight trioxane, 2 parts by weight ethylene oxide and 0.5 part by weight resorcinol diglycidyl ether;

100 parts by weight trioxane, 2.1 parts by weight ethylene oxide and 0.5 part by weight pentaerythritol diformal;

100 parts by weight trioxane, 2.2 parts by weight ethylene oxide and 1.0 part by weight pentaerythritol diformal;

100 parts by weight trioxane, 16.8 parts by weight 1,3-dioxolane and 0.5 part by weight vinylcyclohexene dioxide;

100 parts by weight trioxane, 2 parts by weight ethylene oxide and 0.1 part by weight diglycidyl ether of bisphenol A.

Serendipitously, it is to be noted that other desirable properties are realized through the use of acicular calcium metasilicate in the oxymethylene polymer molding mixtures of the instant invention.

Although calcium metasilicate is characterized by a long, needle-like structure and sustains high tensile properties in the copolymer composition, articles molded therefrom are essentially warp-free under asymmetrically gated conditions.

The acicular calcium metasilicate addition also significantly raises the arc resistance of articles molded therefrom as measured by ASTM 495 and continues to increase said resistance with increase in metasilicate concentration.

Although the acicular calcium metasilicate level in the polymer is determined to a great extent by the desired properties, the preferred range of the instant invention is from about 2 to about 75 weight percent and the most preferred range from about 2 to about 40 weight percent both based on the weight of the total composition. Furthermore when a reinforcing agent such as glass is incorporated, the preferred range is from 5 to about 50 weight percent and the most preferred range is from about 20 to about 40 weight percent based on the weight of the polyoxymethylene polymer.

It is to be understood that the foregoing detailed description is given merely by way of illustration and that many variations may be made therein without departing from the spirit and scope of the invention.

What is claimed is:

1. A molding resin having improved processability comprising
(a) an intimate blend of an oxymethylene copolymer comprising 85 percent to about 99.9 weight percent recurring —OCH$_2$— groups interspersed with groups of the formula:

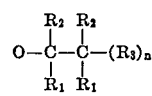

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals and $n$ is an integer from 0 to 3, inclusive, each lower alkyl radical having from 1 to 2 carbon atoms, inclusive, said —OCH$_2$— groups consisting from 85 percent to 99.9 percent of the recurring units and said groups represented by the formula:

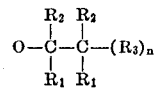

being incorporated during the step of copolymerization to produce said copolymer by the opening up of a ring of a cyclic ether having adjacent carbon atoms by the breaking of an oxygen-to-carbon linkage; said copolymer having a number average molecular weight of at least 10,000 and a melting point of at least 150° C. and
(b) from about 2 to about 75 weight percent based on the total weight of the composition of acicular calcium metasilicate free of a coupling agent.

2. The molding resin of claim 1 wherein the acicular calcium metasilicate is present in the range of about 2 to about 40 weight percent based on the weight of the total composition.

3. A molding resin having improved processability comprising
(a) an intimate blend of an oxymethylene copolymer comprising 85 percent to about 99.9 weight percent recurring —OCH$_2$— groups interspersed with groups of the formula:

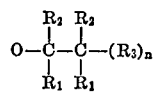

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals and $n$ is an integer from 0 to 3, inclusive, each lower alkyl radical having from 1 to 2 carbon atoms, inclusive, said —OCH$_2$— groups consisting from 85 percent to 99.9 percent of the recurring units and said groups represented by the formula:

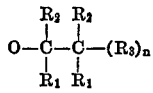

being incorporated during the step of copolymerization to produce said copolymer by the opening up of a ring of a cyclic ether having adjacent carbon atoms by the breaking of an oxygen-to-carbon linkage; said copolymer having a number average molecular weight of at least 10,000 and a melting point of at least 150° C.;

(b) from about 2 to about 75 weight percent based on the total weight of the composition of acicular calcium metasilicate free of a coupling agent and (c) from about 5 to about 50 weight percent based on the total weight of the composition of a reinforcing agent.

4. The molding resin composition of claim 3 wherein the acicular calcium metasilicate is present in the range of from about 2 to about 40 weight percent based on the total weight of the composition and the reinforcing agent is present in the range of from about 20 to about 40 weight percent based upon the weight of the polymer.

5. A process for preparing a molding resin having improved processability comprising intimately blending (a) an oxymethylene copolymer comprising 85 percent to about 99.9 weight percent recurring —OHC$_2$— groups interspersed with groups of the formula:

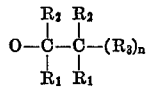

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals and $n$ is an integer from 0 to 3, inclusive, each lower alkyl radical having from 1 to 2 carbon atoms, inclusive, said —OCH$_2$— groups consisting from 85 percent to 99.9 percent of the recurring units and said groups represented by the formula:

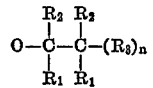

being incorporated during the step of copolymerization to produce said copolymer by the opening up of a ring of a cyclic ether having adjacent carbon atoms by the breaking of an oxygen-to-carbon linkage; said copolymer having a number average molecular weight of at least 10,000 and a melting point of at least 150° C. and (b) from about 2 to about 75 weight percent based on the total weight of the composition of acicular calcium metasilicate free of a coupling agent.

6. A process for preparing a molding resin having improved processability comprising intimately blending (a) an oxymethylene copolymer comprising 85 percent to about 99.9 weight percent recurring —OCH$_2$— groups interpersed with groups of the formula:

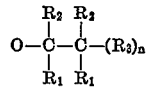

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals and $n$ is an integer from 0 to 3, inclusive, each lower alkyl radical having from 1 to 2 carbon atoms, inclusive, said —OCH$_2$— groups consisting from 85 percent to 99.9 percent of the recurring units and said groups represented by the formula:

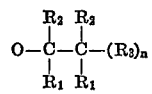

being incorporated during the step of copolymerization to produce said copolymer by the opening up of a ring of a cyclic ether having adjacent carbon atoms by the breaking of an oxygen-to-carbon linkage; said copolymer having a number average molecular weight of at least 10,000 and a melting point of at least 150° C.;

(b) from about 2 to about 75 weight percent based on the total weight of the composition of acicular calcium metasilicate free of a coupling agent; and (c) from about 5 to about 50 weight percent based on the total weight of the composition of a reinforcing agent.

7. The process of claim 6 wherein the acicular calcium metasilicate is present in the range of from about 2 to about 40 weight percent based upon the total composition weight and the reinforcing agent is present from about 20 to about 40 weight percent based on the polymer weight.

8. The molding resin composition of claim 4 wherein the reinforcing agent is glass.

References Cited

UNITED STATES PATENTS

| 3,027,352 | 3/1962 | Walling et al. | 260—67 FP |
| 3,200,090 | 8/1965 | Dolce et al. | 260—37 AL X |
| 2,888,377 | 5/1959 | Allen | 106—306 X |

FOREIGN PATENTS

| 1,069,752 | 5/1967 | Great Britain | 260—37 AL |
| 793,744 | 4/1958 | Great Britain | 260—37 AL |

LEWIS JACOBS, Primary Examiner